United States Patent [19]

Abe et al.

[11] 4,302,136

[45] Nov. 24, 1981

[54] HELICAL CONICAL SPRING LOCK-WASHER AND METHOD OF FORMATION THEREOF

[76] Inventors: Michio Abe, c/o Abe Gijutsu Consultant, No. 119, 2-Chome, Mino-Cho, Kasugai-Shi, Aichi-Ken; Tomio Urokohara, No. 15, 4-Chome, Yasui-Cho, Kita-Ku, Nagoya-Shi, both of Japan

[21] Appl. No.: 105,638

[22] Filed: Dec. 20, 1979

Related U.S. Application Data

[63] Continuation of Ser. No. 911,087, May 31, 1978, abandoned.

[30] Foreign Application Priority Data

Jun. 20, 1977 [JP] Japan ................................. 52-73136

[51] Int. Cl.³ ...................... F16B 39/24; B21D 53/20
[52] U.S. Cl. .................................... 411/158; 10/86 B; 411/156
[58] Field of Search ...................... 151/36, 35, 38, 41; 10/73, 86 B, 79; 411/158, 156

[56] References Cited

U.S. PATENT DOCUMENTS

| 329,738 | 11/1885 | Harvey | 151/36 |
|---|---|---|---|
| 1,020,438 | 3/1912 | Norlund | 151/36 |
| 2,345,419 | 3/1944 | Olson | 151/36 |
| 2,624,128 | 1/1953 | Phillips | 151/35 X |
| 3,097,679 | 7/1963 | Jordan | 151/36 |
| 3,221,792 | 12/1965 | Poupitch | 151/38 |
| 3,476,009 | 11/1969 | Markey | 151/38 X |
| 4,103,725 | 8/1978 | Abe | 151/35 |

FOREIGN PATENT DOCUMENTS

| 81381 | 7/1956 | Denmark | 151/36 |
|---|---|---|---|
| 2649077 | 5/1977 | Fed. Rep. of Germany | 151/35 |
| 519459 | 3/1940 | United Kingdom | 151/35 |

*Primary Examiner*—Rodney H. Bonck
*Attorney, Agent, or Firm*—Wenderoth, Lind & Ponack

[57] ABSTRACT

A helical conical spring lock-washer includes a lock-washer body having formed on one surface thereof a plurality of triangular pyramid-shaped depressions. Each of the depressions provides a triangular opening formed on the respective surface of the lock-washer body, with the base of the triangular opening positioned adjacent to the outer margin of the lock-washer body and the apex of the triangular opening directed toward the center of the lock-washer body.

9 Claims, 8 Drawing Figures

HELICAL CONICAL SPRING LOCK-WASHER AND METHOD OF FORMATION THEREOF

This is a continuation of application Ser. No. 911,087, filed May 31, 1978, now abandoned.

BACKGROUND OF THE INVENTION

This invention relates to a helical conical spring lock-washer, and more particularly to a helical conical spring lock-washer which is designed to further improve the effect obtainable by the "Conical Spring Washer" which is the subject of U.S. Pat. No. 4,103,725, and also to further reduce the production cost of such washer, as well as to a method of formation of such lockwasher.

Hithertofore, as spring lock-washers, spring washers of rectangular cross section, conical spring washers and internal or external toothed lock-washers have been known.

The spring washer is produced by winding a flat steel wire into a continuous spiral and cutting the spiral by each turn of the spiral. The spring washer is the least expensive, with respect to material cost and production cost, of known washers for the prevention of loosening. However, the non-loosening effect obtainable by this type of washer is quite doubtful and some automobile makers have completely abandoned the use of such washer. The reason for such abandonment of use is due to the facts that unstable induced axial forces are developed by the rotation of the washer together with a fastening device such as a bolt or nut during the tightening of the fastening device, and that insufficient spring effects remain after the tightening of the fastening device.

In addition to the spring washer, there are conical spring washers and internal or external toothed lock-washers which are produced from a steel sheet or steel strip. Although these washers exhibit stable induced axial forces and an excellent non-loosening effect over the spring washer, the yield rate of these washers is 40–50%, and these washers thus have the disadvantage of considerably high production costs due to required pressing operations.

SUMMARY OF THE INVENTION

Therefore, one object of the present invention is to provide a helical conical spring lock-washer which is produced by winding a sheet metal band or coil stock into a spiral ring and cutting the spiral ring at each of the spirals.

Another object of the present invention is to provide a helical conical spring lock-washer which improves the yield rate and which can be produced from a substantially reduced thickness sheet metal, but yet which has substantially improved spring pressure and which induces excellent stabilized axial forces as well as non-loosening effect by press-working the washer body and imparting a suitably curved contour to the bearing surfaces of the washer body.

Another object of the present invention is to provide a helical conical spring lock-washer which can substantially reduce production costs.

A further object of the present invention is to provide a method for the formation of such a helical conical spring lock-washer.

BRIEF DESCRIPTION OF THE DRAWINGS

The above and other objects and attendant advantages of the present invention will be more readily apparent to those skilled in the art from the following description, taken with the accompanying drawings, wherein.

DETAILED DESCRIPTION OF THE INVENTION

Figure 1:
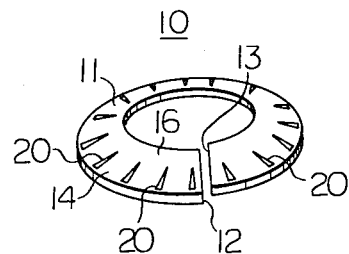
FIG. 1 is a perspective view of the helical conical spring lock-washer according to the present invention.

Referring to FIGS. 1 through 4, a preferred embodiment of a helical conical spring lock-washer according to the present invention is generally shown by reference numeral 10.

Figure 2:
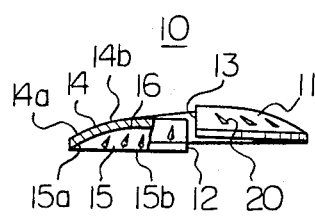
FIG. 2 is an elevational view of the helical conical spring lock-washer of FIG. 1 with a portion thereof broken away.

The helical conical spring lock-washer 10 comprises a washer body 11 which has been formed by winding a steel metal band or coil stock, which has a width selected for the ring of the intended lock-washer, into a continuous spiral shape and cutting the continuous steel metal spiral band at each turn of the spiral. As more clearly shown in FIG. 3, the washer body 11 includes upper and lower radial bearing surfaces 14, 15 which have radially outer portions 14a, 15a, respectively, inclined at an angle with respect to the horizontal or to the base of the washer to provide a dish shape to the washer body and which also have radially inner portions 14b, 15b, respectively, extending horizontally or inclining downwardly to form a washer crown 16. And as shown in FIGS. 1, 2, and 4, the washer body 11 is helically bent to position the opposite end faces 12, 13 of the ring on different levels.

Furthermore, the upper bearing surface 14 is provided with a plurality of circumferentially spaced triangular pyramid depressions 20 formed by press-working to thereby provide the complete helical conical spring washer 10. The triangular pyramid depressions 20 are punched on the upper bearing surface 14 of the washer body 11 adjacent to the outer margin of the washer body, and each of the triangular pyramid depressions 20 has a gently inclined inner side face 18 extending generally in the tightening direction of a fastening device such as a bolt and a nut and a steeply inclined inner side face 19 extending generally in the loosening direction of the bolt and nut.

The triangular pyramid depressions 20 punched on the upper bearing surface 14 of the washer body 11 form triangular openings on the upper bearing surface 14 of the washer body 11 with bases 21 of the triangular openings positioned adjacent to the outer margin of the washer body 11 and with the apices 22 of the triangular openings directed toward the center of the washer body 11. The depressions 20 are formed on the upper bearing surface 14 in a suitably spaced relationship in the circumferential direction along the outer margin of the washer body 11.

Figure 3:
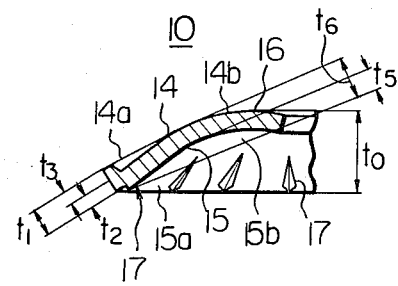
FIG. 3 is a cross-sectional view of the washer of FIG. 2, but on an enlarged scale and with a portion thereof broken away.
Figure 4:
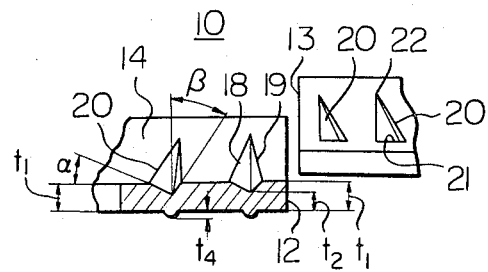
FIG. 4 is a fragmentary view on an enlarged scale showing the opposite end portions of the washer.

As appreciated in FIGS. 3 and 4, the triangular pyramid depressions or wedge-shaped punched recesses 20 have a maximum depth adjacent to the outer margin of the washer body 11 and decrease in depth and width toward the center of the washer body 11. The triangular pyramid depressions 20 extend by a distance corresponding to substantially one-half the ring width of the washer body 11. Furthermore, as more clearly shown in FIG. 4, the triangular pyramid depressions 20 are so punched in the upper bearing surface 14 that the inclination angle $\alpha$ of the gently inclined inner side face 18 (the angle in the tightening direction of the bolt and nut) is within the range of 45°–60°, the angle $\beta$ of the steeply inclined inner side face (the inclination angle in the direction opposite to the rotation or tightening direction of the bolt and nut) is within the range of 90°–45°, and the maximum depth $t_3$ is within the range of $\frac{1}{4}$ to $\frac{1}{2}$ the thickness $t_1$ of the sheet metal band.

When the triangular pyramid depressions 20 are punched in the upper bearing surface 14, corresponding triangular projections 17 are formed on the lower bearing surface 15. The triangular projections 17 have dimensions smaller than those of the triangular pyramid depressions 20 because the projections are formed by the lower die of a punch die set. However, the corresponding contoured projections 17 are not required to be formed precisely.

Figure 5:
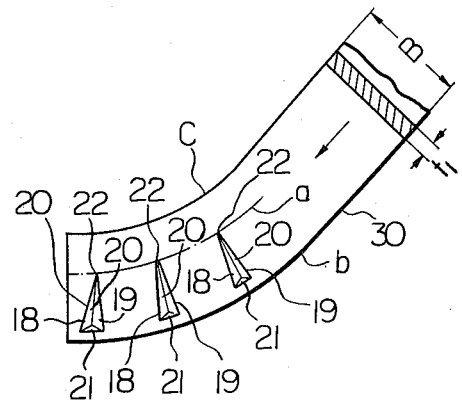
FIG. 5 is a plan view of an indefinite length of hooped flat steel sheet on which a plurality of triangular pyramid depressions are punched in a suitably spaced relationship, and illustrating the method of the present invention.
Figure 6:
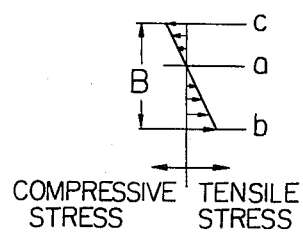
FIG. 6 is a diagram showing the stress conditions on that portion of the steel sheet where the triangular pyramid depressions have been punched.

FIGS. 5 and 6 show the stress conditions and steel band deformation conditions when an indefinite length or hooped flat steel sheet 30 having a width B is formed with the triangular pyramid depressions 20 by punching. When the triangular pyramid depressions 20 are formed on one major surface of the flat steel sheet 30 in a suitably spaced relationship extending from the neutral line a of the steel sheet toward the outer peripheral edge b of the steel sheet, the steel sheet is compressively deformed to reduce the thickness $t_1$ of the steel sheet of the thickness $t_2$ (FIG. 4), and therefore the outer peripheral edge b is substantially extended in the longitudinal direction of the steel sheet. However, there is no extension in the vicinity of the neutral line a as shown in FIG. 5. Therefore, the steel sheet 30 is inwardly curved by a large angle at the outer peripheral edge b so as to position the center of curvature outwardly of the inner peripheral edge c as shown in FIG. 5, and the portion of the steel sheet 30 extending from the neutral line a to the inner peripheral edge c is subjected to a compressive stress increasing gradually from the neutral line a to the inner peripheral edge c, as shown in the stress diagram of FIG. 6.

Such compressive stress causes the portion of the flat steel sheet 30 extending from the neutral line a to the inner peripheral edge c to curve toward the reverse side of the steel sheet, i.e. toward the side of the steel sheet opposite to the side thereof having the depressions 20 formed therein, and forms the washer crown 16 having the cross section in the width direction of the steel sheet as shown in FIG. 3 when the complete lock-washer has been formed.

By the utilization of the curving of the flat steel sheet 30, referred to above, caused by the preliminary punching process, the helical conical spring lock-washer of the present invention can be easily formed by the use of a flat steel sheet having a thickness substantially thinner than those of flat steel sheets which have been conventionally processed into prior art spring washers through the processing steps in a prior art machine. Thus, the formation of depressions 20 not only automatically causes the steel sheet 30 to be deformed into the spiral shape, but also forms the curving of the cross-sectional configuration of the thus formed spiral.

The operation for fastening an article 42 to another article (not shown) by the employment of the helical conical spring lock-washer 10 of the invention, together with a bolt 40 and a flanged nut 41, will now be described with reference to FIG. 7. In the cross-sectional view of FIG. 7, the left-hand portion thereof shows the initial stage in the fastening operation, while the right-hand portion thereof shows the final stage in the fastening operation.

Figure 7:
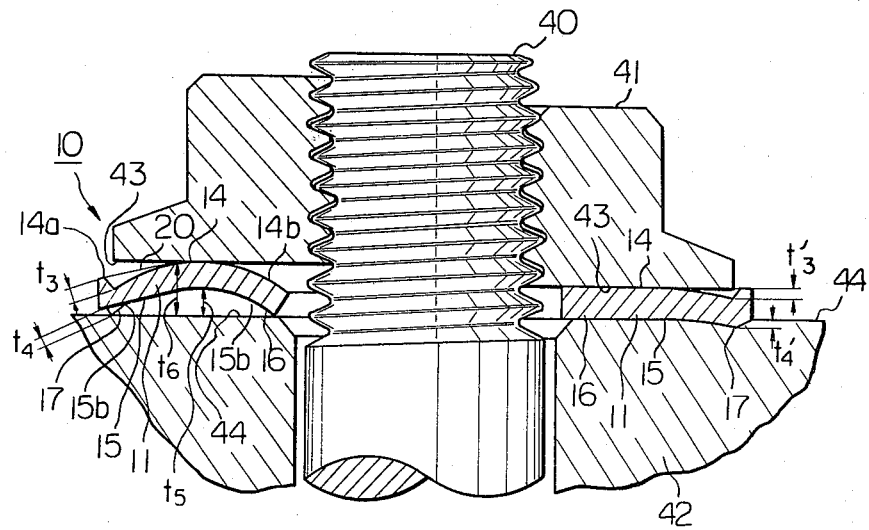
FIG. 7 is a vertically sectional view of the helical conical spring lock-washer of FIG. 1 employed in a fastening operation, wherein the left half of FIG. 7 shows the washer in the initial fastening stage, and the right half of FIG. 7 shows the washer in the final fastening stage.

In the initial fastening stage as shown in the left-hand portion in the cross-sectional view of FIG. 7, the flanged nut 41 is partially tightened, the free height $t_0$ of the spring lock-washer 10 (FIG. 3) is deformed to the height $t_6$, and the inner surface of the spring lock-washer 10 has a height $t_5$ attained by curving the steel sheet of the washer body 11 in the width direction thereof so as to contact the surface 44 of the article 42 to be fastened. The fastening torque by the nut 41 is quite small during this initial stage of the fastening operation.

As the nut 41 is further tightened after the initial stage, the ridges of the triangular projections 17 on the lower bearing surface 15 of the spring lock-washer 10 cut into the surface 44 of the article 42 to be fastened and substantially increase the coefficient of friction of the lower bearing surface 15, to thereby prevent the spring lock-washer 10 from rotating together with the nut 41 as the nut 41 is rotated or tightened. As the flanged nut 41 is further continued to be tightened against the double circumferential free support spring reaction force in the width direction of the washer body 11 developed by the curving height $t_5$ and the spring force provided by the triangular pyramid depressions 20 and triangular projections 17 until the height $t_5$ is reduced to zero, the spring lock-washer 10 is compressed to a flat configuration between the lower bearing surface 43 of the nut 41 and the surface 44 of the article to be fastened.

When the spring lock-washer 10 is compressed between the nut 41 and article 42 as mentioned hereinabove, a portion of the steeply inclined inner side face 19 of each of the triangular depressions 20 resiliently cuts into a peripheral portion of the lower bearing surface 43 of the nut by the spring force provided by the configuration of the punched triangular depressions 20, to thereby complete the fastening operation (see the right-hand portion in the cross-sectional view of FIG. 7).

Furthermore, the functions of the helical conical spring lock-washer 10 of the present invention and of the prior art conical spring and toothed washers will be described for comparison purposes. In the prior art conical washer, since the outer and inner margins of the washer contact the surface of the article to be fastened and the bearing surface of the nut, respectively, whereby the spring reaction force of the washer causes the washer to function as a single circumferential free support spring, the sheet metal required to enable the conical washer to function as a single circumferential free support spring must have a relatively great thickness. For example, the conical washer is required to have a strength of 10T by JIS Standard (tensile strength of 100 kg/mm$^2$) and a thickness of 1.8 mm for a bolt of the dimension of M10 (thread diameter of 10 mm). On the other hand, the helical conical spring lock-washer 10 of the present invention can be produced from a steel sheet having a smaller thickness by the combined effect of the double circumferential free support spring effect developed by the curvature $t_5$ in the width direction of the steel sheet and of the spring reaction force provided by the triangular pyramid depressions 20 and projections 17 formed by punching, as will be easily appreciated from the left-hand portion of the cross-sectional view of FIG. 7. In other words, the spring lock-washer 10 of the invention is able to provide the necessary strength of 10T of the JIS Strength Standard with a reduced sheet thickness within the range of 1.0-0.8 mm for a bolt having the dimension of M10, in contrast to the sheet thickness of 1.8 mm required for the prior art conical lock-washer. Furthermore, the prior art conical washer is not provided with any effective means adapted to prevent relative rotation between the lower bearing surface of the washer and the opposite surface of the article to be fastened during the tightening of the bolt, and also to prevent loosening of the washer after the fastening thereof, other than the reaction force of the member. On the other hand, the helical conical spring lock-washer 10 of the present invention is provided with a plurality of triangular pyramid depressions 20 and corresponding triangular projections 17 formed by punching, and the projections 17 are adapted to cut into the opposite surface of the article to be fastened during the tightening of the bolt, whereby the coefficient of friction between the lower bearing surface of the washer 10 and the opposite surface of the article to be fastened is increased and the washer is prevented from rotating together with the nut or bolt when the fastening means is tightened or rotated. Furthermore, during the initial stage of the nut or bolt tightening operation, the bearing surface of the fastening means and the opposite surface of the article to be fastened contact the center flat portions of the upper and lower bearing surfaces 14, 15 of the washer 10, respectively, and in the final stage of the fastening operation, the bearing surface of the nut or bolt slides along the gently inclined faces of the triangular pyramid depressions 20 or the gently inclined outer side faces corresponding to the gently inclined inner side faces 18 of the depressions 20 and is fastened while maintaining a stabilized coefficient of friction. At the completion of the nut or bolt tightening operation, portions of the steeply inclined faces of the punched depressions 20 or portions of the steeply inclined inner side faces 19 of the punched depressions elastically or plastically deform to slightly cut into the bearing surface of the nut or bolt as time elapses, to thereby effectively prevent the nut or bolt from loosening.

The prior art toothed washer has the disadvantages that the corners of the steeply angled tooth edges tend to flaw the bearing surface of the article to be fastened and that the washer itself has a reduced bearing surface area due to the provision of the teeth.

Furthermore, since the prior art conical spring washers and toothed washers are all produced by the stamping of sheet metal, the loss of material amounts to 50-60%, thereby increasing material costs. At the same time the production cost is increased in view of expenses of tools and production rate per unit time. On the other hand, the helical conical spring lock-washer of the present invention can be produced by a much less expensive production method. According to the method of the present invention, the helical conical spring lock-washer is formed by employing the above-discussed punching step to an endless steel sheet, thereby forming the spiral shape and also the curved cross section resulting in crown 16. The thickness of the steel sheet from which the helical conical spring lock-washer of the invention is produced may be smaller than that of the steel sheets for any of the prior art washers and can be produced at less expense while retaining the effect of positive prevention of the loosening of the bolt and/or nut. That is, the helical conical spring lock-washer of the present invention exhibits quite excellent effects such as the stabilization of the induced axial force for a designed fastening torque, which is most important for a lock-washer, and the prevention of loosening under application of an external force after the tightening of the bolt and/or nut.

Figure 8:
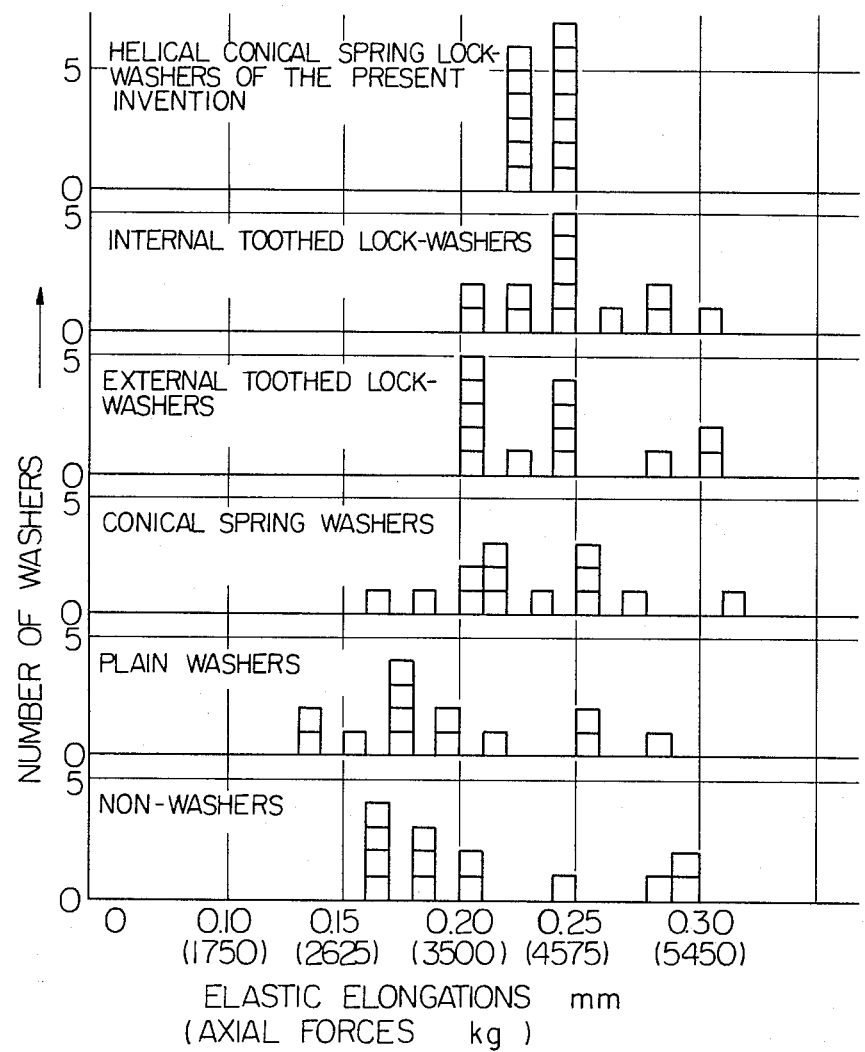
FIG. 8 is a comparative graph showing elastic elongations of bolts for a tightening torque of 600 kg-cm$^2$ and employing various types of washers.

The degree of stabilization of the induced axial force for the designed fastening torque and the degree of non-loosening in the spring lock-washer of the present invention are superior to those of the prior art flat, conical, and external or internal toothed washers, as will be appreciated from the showing of FIG. 8. That is, in FIG. 8, the elastic elongations (axial forces) of the bolt at a fastening torque of 600 kg-cm$^2$ for the spring lock-washer of the invention and the prior art plain, conical, and external or internal toothed washers are shown. From FIG. 8, it will be appreciated that the washer of the present invention exhibits a very stabilized axial force for the same torque. In the comparison shown in FIG. 8, the bolt employed was a M10×80, and both the nut and bolt employed had 11T strength by the JIS Strength Standard, and the two articles to be fastened together were conventional structural rolled steel products with machined surface finishes. The helical conical spring lock-washer of the invention employed had a thickness of 1.0 mm, the prior art plain washer had a thickness of 1.5 mm, the prior art conical spring washer had a thickness of 1.2 mm, the prior art external toothed washer had a thickness of 0.9 mm, and the prior art internal toothed washer had a thickness of 0.9 mm.

Since the spring lock-washer according to the present invention referred to hereinabove is produced by spirally winding a sheet metal band, and cutting the spirally wound sheet metal band at each turn of the spiral, the yield rate is substantially improved. Additionally, in spite of the fact that the sheet thickness has been substantially reduced, by punching the plurality of triangular pyramid depressions and thereby imparting to the washer body 11 a suitably curved cross-sectional configuration including the formation of the washer crown 16, it is possible to obtain a helical conical spring lock-washer in which the overall spring pressure of the washer is improved, there are attained excellent stabilized axial force and anti-loosening effects, and production costs are reduced.

While only one embodiment of the invention has been shown and described in detail, it will be understood that the same is for illustration purposes only and not to be taken as a definition of the invention, since various modifications may be made without departing from the scope of the invention.

What we claim is:

1. A helical conical spring lock-washer for fitting between a fastening device and a member to be fastened by said fastening device, said lock-washer comprising:

a washer body formed of a helically wound thin band of metal with a central axial opening therethrough;

said washer body having an upper bearing surface dimensioned to be substantially the same size as an underside of a fastening device and adapted to be contacted thereby;

said washer body having a lower bearing surface adapted to contact a member to be fastened;

said washer body having an inner circumferential edge defining said opening and an outer circumferential edge;

said washer body being divided at a position extending between said inner and outer circumferential edges, thereby defining adjacent ends of said washer body, said ends being axially spaced;

said washer body having a transverse radial cross-sectional configuration when in the nondeformed state, such that, between said inner and outer circumferential edges, said upper bearing surface is convex and said lower bearing surface is concave, said upper and lower bearing surfaces extend in axially inclined directions from said outer circumferential edge, whereby said washer body has a generally conical portion, said conical portion being adjacent the outer marginal portion of said washer body, and the inner marginal portion of said washer body being in the form of a crown which is inclined axially opposite of the direction of inclination of said conical portion;

a plurality of triangular pyramid depressions formed in said washer body from said upper bearing surface thereof to said lower bearing surface thereof, said depressions forming correspondingly positioned and shaped projections extending outwardly from said lower bearing surface, said projections being smaller in size than said depressions, said depressions forming triangular shaped openings in said upper bearing surface, each said triangular shaped opening having a base facing said outer circumferential edge and an apex directed toward said central opening, and each said depression having a first inner side face gently inclined generally in the tightening direction of a fastening device and a second inner side face steeply inclined in a direction generally opposite to said tightening direction; and said washer body having a resiliency such that said washer body may be deformed into a flat shape upon a complete tightening of the fastening device.

2. A lock-washer as claimed in claim 1, wherein said depressions are circumferentially spaced about said washer body, and each said depression has a lower apex positioned adjacent said outer circumferential edge.

3. A lock-washer as claimed in claim 1, wherein said depressions are equally circumferentially spaced about said washer body adjacent said outer circumferential edge.

4. A lock-washer as claimed in claim 1, wherein said first inner side face of each said depression extends at an angle of from 45° to 60° with respect to said tightening direction, and said second inner side face of each said depression extends at an angle of from 90° to 45° with respect to said direction opposite to said tightening direction.

5. A method for forming helical conical spring lock-washers, said method comprising:

providing a resilient, flat, elongated sheet metal band having first and second surfaces and first and second edges;

forming triangular pyramid-shaped depressions in said first surface at positions adjacent said first edge and spaced longitudinally of said band, thereby imparting tensile stress in said band, longitudinally thereof, adjacent said first edge, and imparting compressive stress in said band, longitudinally thereof, adjacent said second edge, such that said tensile stress adjacent said first edge and said compressive stress adjacent said second edge cause said band to deform into a helical configuration with said first edge forming an outer edge of said helical configuration and with said second edge forming an inner edge of said helical configuration, and such that said compressive stress causes a portion of said band adjacent said second edge to deform in a direction away from said first surface, whereby the transverse radial cross section of said helical configuration is curved with said first surface being convex and with said second surface being concave; and dividing said band in said helical configuration, thereby forming individual helical conical spring lock-washers.

6. A method as claimed in claim 5, comprising dividing said band at each turn of said helical configuration.

7. A method as claimed in claim 5, comprising dividing said band substantially radially of said helical configuration.

8. A method as claimed in claim 5, wherein said step of forming said depressions simultaneously results in formation of corresponding projections extending outwardly from said second surface of said band.

9. A method as claimed in claim 5, wherein said depressions form triangular shaped openings in said first surface, with bases of said openings positioned adjacent said first edge and with apices of said openings directed toward said second edge.

* * * * *